(12) United States Patent (10) Patent No.: US 7,896,120 B2
Mochizuki et al. (45) Date of Patent: Mar. 1, 2011

(54) SMALL-SIZED VEHICLE WITH IMPROVED DRIVETRAIN

(75) Inventors: Shigehiro Mochizuki, Shizuoka (JP); Kazuhiko Izumi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 322 days.

(21) Appl. No.: 12/060,974

(22) Filed: Apr. 2, 2008

(65) Prior Publication Data

US 2009/0250284 A1  Oct. 8, 2009

(51) Int. Cl.
    *B60K 17/354* (2006.01)
(52) U.S. Cl. ........................ 180/247; 475/150
(58) Field of Classification Search .............. None
    See application file for complete search history.

(56) References Cited

U.S. PATENT DOCUMENTS

| 2,460,295 | A | * | 2/1949 | Keese | 475/203 |
|---|---|---|---|---|---|
| 2,521,730 | A | * | 9/1950 | Keese | 192/53.361 |
| 5,181,893 | A | * | 1/1993 | Ashikawa et al. | 475/203 |
| 6,503,167 | B1 | * | 1/2003 | Sturm | 475/231 |
| 6,601,668 | B2 | * | 8/2003 | Kitai et al. | 180/233 |
| 6,729,992 | B2 | * | 5/2004 | Ima | 475/222 |
| 6,835,155 | B2 | * | 12/2004 | Busch et al. | 475/231 |
| 6,883,630 | B2 | * | 4/2005 | Morin | 180/244 |
| 6,938,748 | B2 | * | 9/2005 | Pennycuff | 192/84.6 |
| 6,959,799 | B2 | * | 11/2005 | Fusegi et al. | 192/84.6 |
| 2009/0184536 | A1 | * | 7/2009 | Kubota | 296/65.09 |

FOREIGN PATENT DOCUMENTS

JP   2002-059754 A   2/2002

* cited by examiner

*Primary Examiner*—Tony H. Winner
(74) *Attorney, Agent, or Firm*—Keating & Bennett, LLP

(57) ABSTRACT

A small-sized vehicle (SSV) capable of inhibiting a differential unit from becoming large in a vertical direction includes an engine, a rear output shaft portion arranged to extend rearwardly of the engine and serving to transmit a driving force of the engine rearward, an intermediate shaft portion rotated by the rear output shaft portion and extended in a vehicle width direction, a rear-wheel differential unit rotated by the intermediate shaft portion and serving for differential movements of a pair of rear-wheel axle shafts connected to a pair of rear wheels.

23 Claims, 8 Drawing Sheets

SMALL-SIZED VEHICLE WITH IMPROVED DRIVETRAIN

BACKGROUND OF THE INVENTION

1. Field of the Invention

The present invention relates to a small-sized vehicle, and more particularly, to a small-sized vehicle provided with a differential unit having a low profile for differential movements of rear-wheel axle shafts.

2. Description of Related Art

Conventionally, there is known a small-sized vehicle provided with a differential unit for differential movements of axle shafts. Such small-sized vehicle is disclosed in, for example, JP-A-2002-059754.

JP-A-2002-059754 described above discloses multi-wheeled drive vehicle provided with a differential part which is rotated by a transmission gear mechanism connected to an engine to achieve differential movements of rear wheels. The differential part of the multi-wheeled drive vehicle disclosed in JP-A-2002-059754 is provided with an input gear, which meshes with an output gear of the transmission gear mechanism, and driven (rotated) directly by the transmission gear mechanism.

In the case where a differential part is driven directly by a transmission gear mechanism as in the multi-wheeled drive vehicle disclosed in JP-A-2002-059754, however, it is necessary to increase a reduction ratio of an output gear and an input gear. Therefore, since a diameter of the input gear becomes large as compared with a diameter of the output gear, there is caused a problem that a differential part becomes large in a vertical direction.

SUMMARY

It is an object of the present invention to provide a small-sized vehicle with a differential unit of reduced height.

In order to attain the object, a small-sized vehicle in a first aspect of the invention comprises an engine, a rear output shaft portion arranged to extend rearwardly of the engine and serving to transmit a driving force of the engine rearward, an intermediate shaft portion rotated by the rear output shaft portion and extended in a vehicle width direction, a rear-wheel differential unit rotated by the intermediate shaft portion and serving for differential movements of a pair of rear-wheel axle shafts connected to a pair of rear wheels. Preferably the vehicle also includes a rear actuator capable of switching of the rear-wheel differential unit between a differential state and a differential locked state.

In the small-sized vehicle in the first aspect, as described above, there are provided the rear output shaft portion serving to transmit a driving force of the engine rearward, the intermediate shaft portion rotated by the rear output shaft portion and extended in the vehicle width direction, and the rear-wheel differential unit rotated by the intermediate shaft portion and serving for differential movements of a pair of rear-wheel axle shafts connected to a pair of rear wheels. In this manner, by transmitting a driving force of the engine to the rear-wheel differential unit through the intermediate shaft portion, it is possible owing to the provision of an intermediate gear on the intermediate shaft portion to inhibit a gear for rotation of the rear-wheel differential unit from becoming large, unlike the case where a driving force of the engine is transmitted directly to the rear-wheel differential unit from the rear output shaft portion. Thereby, it is possible to inhibit the rear-wheel differential unit from becoming large in a vertical direction.

A small-sized vehicle in a second aspect of the invention comprises an engine, a rear output shaft portion arranged to extend rearwardly of the engine and serving to transmit a driving force of the engine rearward, an intermediate shaft portion rotated by the rear output shaft portion and extended in a vehicle width direction, and a rear-wheel differential unit rotated by the intermediate shaft portion and serving for differential movements of a pair of rear-wheel axle shafts connected to a pair of rear wheels, and an axis of rotation of the rear-wheel differential unit can be arranged either above or below an extension of the rear output shaft portion, as viewed from laterally of the vehicle.

In the small-sized vehicle in the second aspect, as described above, an axis of rotation of the rear-wheel differential unit can be arranged either above or below an extension of the rear output shaft portion as viewed from laterally of the vehicle whereby it is possible to inhibit the rear-wheel differential unit from becoming too high in position even in the case where the rear output shaft portion is arranged in a state of being inclined rearwardly upward, and it is possible to inhibit the rear-wheel differential unit from becoming too low in position even in the case where the rear output shaft portion is arranged in a state of being inclined rearwardly downward.

DESCRIPTION OF THE PREFERRED EMBODIMENT

Figure 1:
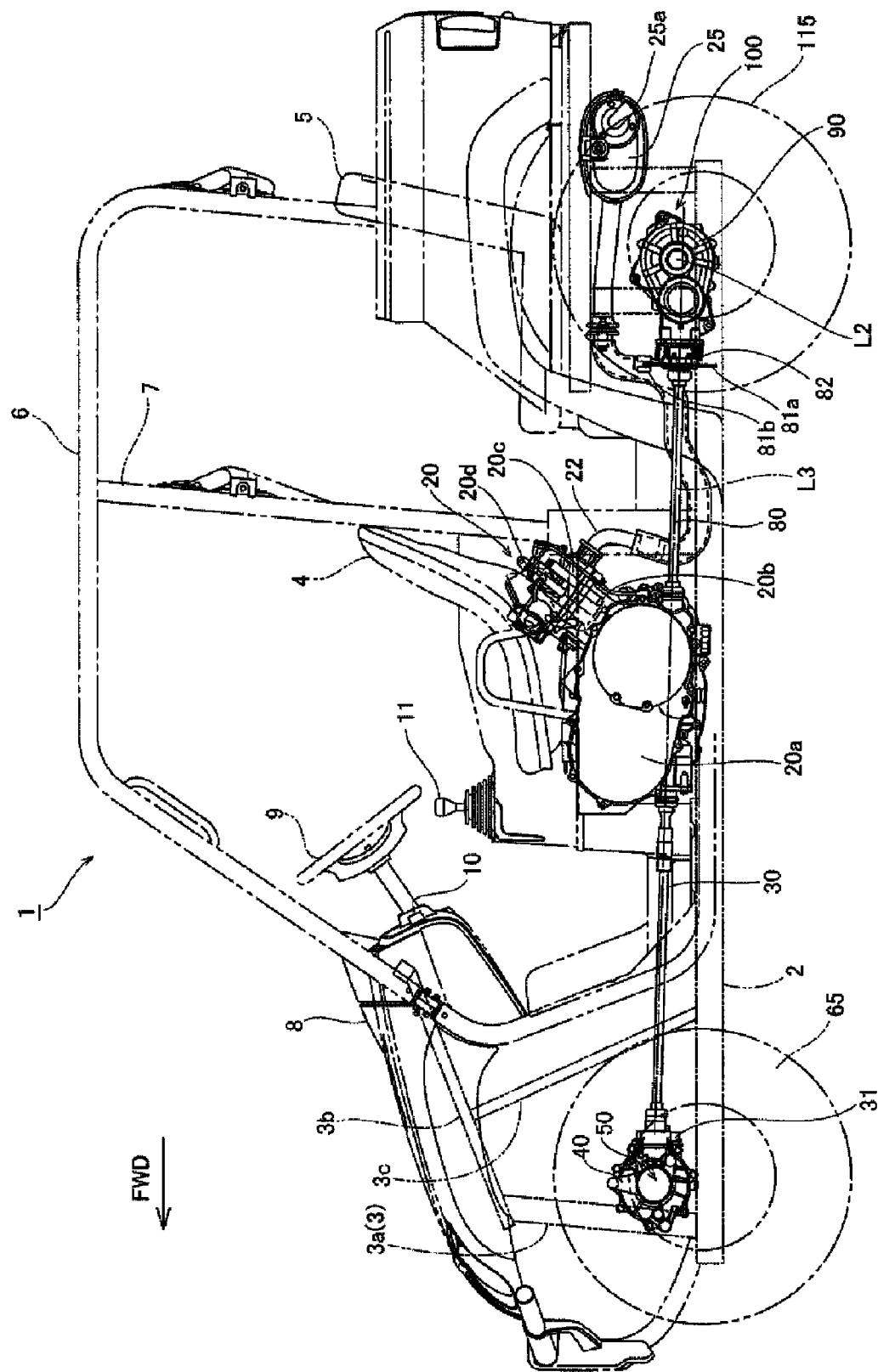
FIG. 1 is a side view showing the whole construction of SSV (Side by Side Vehicle) according to an embodiment of the invention.

An embodiment of the invention will be described below with reference to the drawings.

The construction of SSV according to the embodiment of the invention will be described in detail with reference to FIGS. 1 to 9. In addition, the embodiment will be described with respect to SSV (Side by Side Vehicle) as an example of a small-sized vehicle of the invention. In the drawings, an arrow FWD indicates the front in a traveling direction of SSV.

In SSV according to one embodiment of the invention, a main frame 2 is arranged to extend to the rear from the front of a vehicle body as shown in FIG. 1. A front frame part 3 is fixed to a front end of the main frame 2. The front frame part 3 comprises a front frame 3a, an upper frame 3, and a stay 3c and forms a front frame structure of SSV. Also, an upper frame part 6 is provided on a rear portion of the front frame part 3 in a manner to cover front row seats 4 and rear row seats 5. The upper frame part 6 is fixed to the main frame 2 and connected to a rear portion of the upper frame 3b of the front frame part 3. Also, a center pillar 7 is connected between an upper portion of the upper frame part 6 and the main frame 2. In addition, the front row seats 4 and the rear row seats 5, respectively, are arranged two by two in a vehicle width direction and SSV according to the embodiment is a four-passenger SSV.

A body cover 8 is provided above the front frame part 3. Also, a handle 9 is provided rearwardly of the body cover 8 to project toward the front row seats 4. Also, provided in the vicinity of a region of the body cover 8, in which the handle 9 is provided, is a rotary switch 10, which actuates a servomotor 70 and a servomotor 120 described later to switch a driving state. Also, a shift lever 11 is provided between the two front row seats 4.

An engine 20 is arranged below and between the two front row seats 4. The engine 20 is mainly composed of a crank case portion 20a, a cylinder portion 20, a cylinder head portion 20c, and a cylinder head cover 20d. A transmission mechanism (not shown), an output shaft 21 (see FIG. 2) described later, etc. are arranged in the crank case portion 20a. Also, an intake pipe (not shown) and an exhaust pipe 22 are connected to the cylinder head portion 20c.

Figure 2:
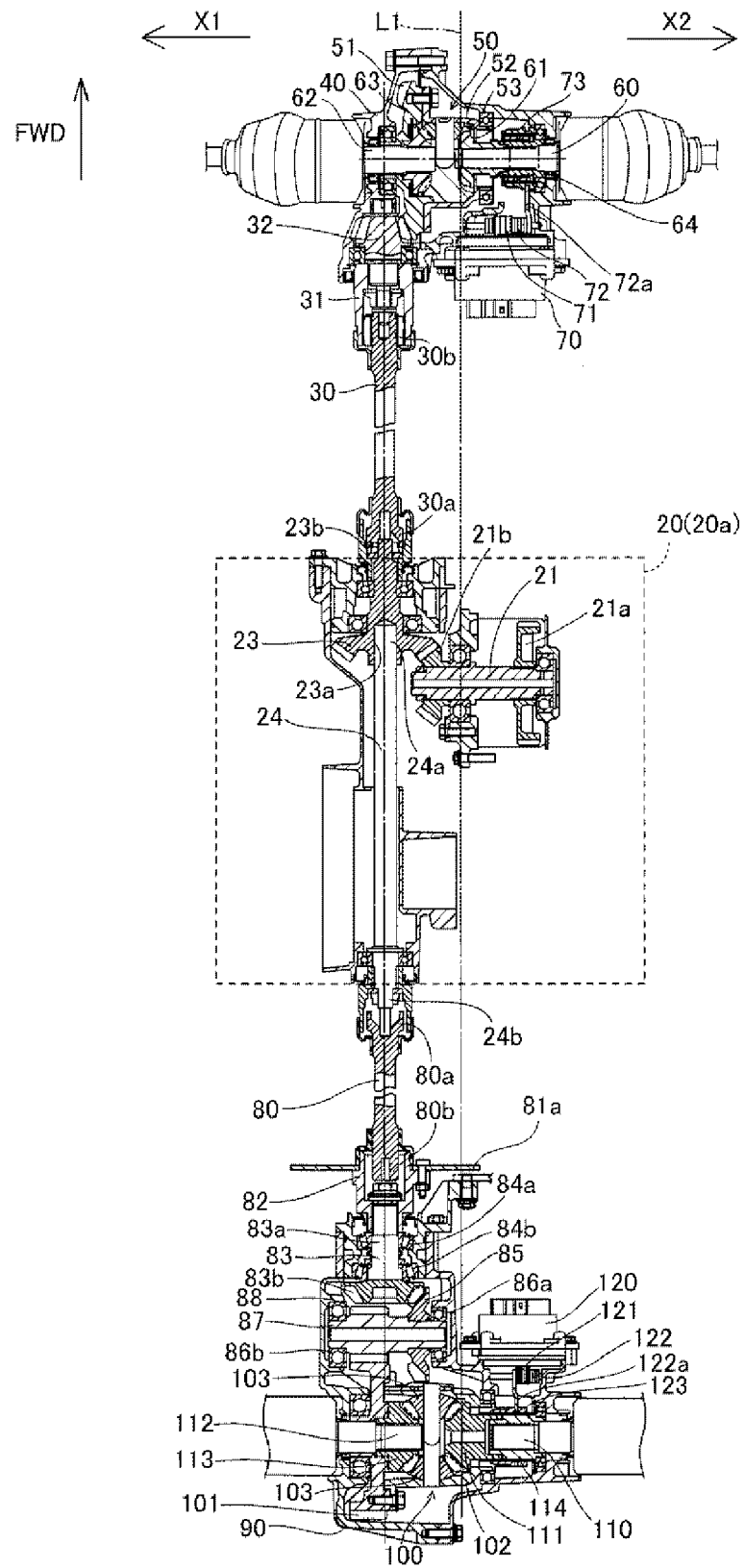
FIG. 2 is a cross sectional view showing the construction of a drive shown for a SSV according to the embodiment shown in FIG. 1.

As shown in FIG. 2, an output shaft 21 is arranged in the crank case portion 20a of the engine 20 to extend in the vehicle width direction (an arrow X1 direction and an arrow X2 direction). The output shaft 21 mounts to one side thereof an input gear 21a comprising a spur gear, to which a driving force is transmitted from a transmission mechanism (not shown) and mounts to the other side thereof an output gear 21b comprising a helical gear. Also, an input gear 23 comprising a helical gear meshes with the output gear 21h of the output shaft 21 and a front end 24a of a longitudinally extending output shaft 24 is fitted into a rear end 23a of the input gear 23. Also, a front end 23b of the input gear 23 is structured to enable mounting to a front shaft 30 described later and a rear end 24b of the output shaft 24 is structured to enable mounting to a rear shaft 80 described later.

Figure 3:
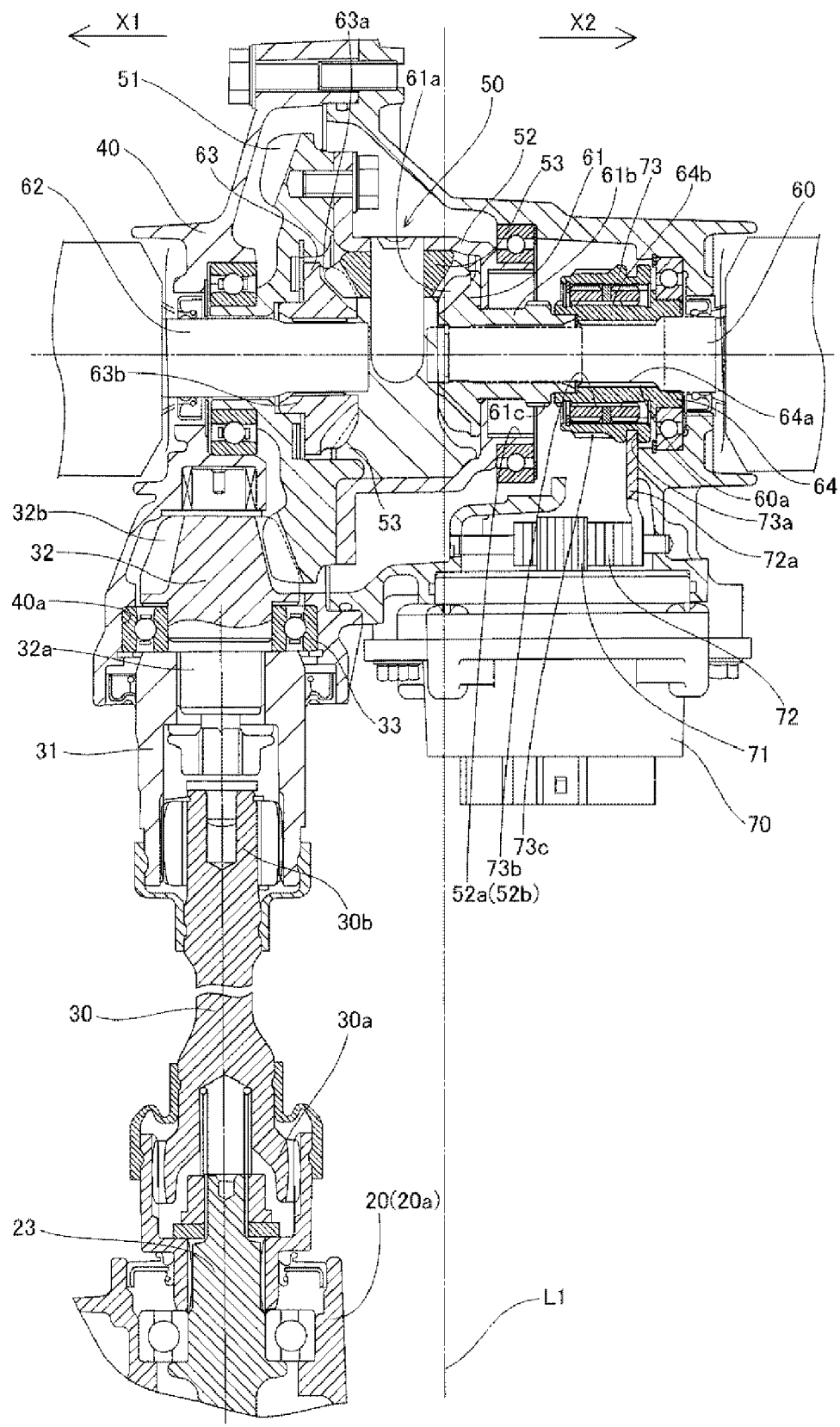
FIG. 3 is a cross sectional view showing the construction of the periphery of a front differential unit of SSV according to the embodiment shown in FIG. 1.

Here, according to the embodiment, a rear end 30a of the front shaft 30 is mounted to the front end 23b of the input gear 23. In addition, the front shaft 30 is an example of "front output shaft portion" of the invention. The front shaft 30 is arranged in the arrow X1 direction relative to a vehicle center line L1, which extends longitudinally as viewed from above SSV, and inclined rearwardly downward. As shown in FIG. 3, a rear portion of a connecting member 31 is mounted to a front end 30b of the front shaft 30 and a rotating shaft portion 32a of an output gear 32 comprising a bevel gear is mounted to a front portion of the connecting member 31. An inner peripheral surface of a bearing 33 is fitted onto the rotating shaft portion 32a of the output gear 32 and an outer peripheral surface of the bearing 33 is fitted into an insertion hole portion 40a of a front gear case 40. Gear portion 32b of the output gear 32 meshes with a ring gear 51 of a front differential unit 50 provided in the front gear case 40. In addition, the front differential unit 50 is an example of "front-wheel differential gear" of the invention.

The ring gear 51 is mounted to a differential case 52. Differential case 52 optionally being constructed for rotation relative to the front gear case 40 as the ring gear 51 rotates. Pinion gear 53 is provided inside the differential case 52.

Right differential gear 61 of a right front-wheel axle shaft 60 (described later) and a left differential gear 63 of a left front-wheel axle shaft 62 (described later) mesh with the pinion gear 53. Recess 52a is formed on the differential case 52 outwardly in the arrow X2 direction and a plurality of spline grooves 52b are formed on an inner peripheral surface of the recess 52a.

Right differential gear 61 of the right front-wheel axle shaft 60 includes a gear portion 61a comprising a helical gear, a shaft inserted portion 61b, and a spline portion 61c. The gear portion 61a meshes with the pinion gear 53 and the shaft inserted portion 61b is arranged so that an inner peripheral surface thereof can idle relative to an outer peripheral surface of the right front-wheel axle shaft 60. Spline portion 61c is formed on the outer peripheral surface of the shaft inserted portion 61b.

A plurality of spline grooves 60a are formed on the outer peripheral surface of the right front-wheel axle shaft 60 outwardly in the arrow X2 direction, the plurality of spline grooves 60a engaging with inner spline grooves 64a formed on an inner peripheral surface of a holding member 64. Outer spline grooves 64b are formed on an outer peripheral surface of the holding member 64, the outer spline grooves 64b engaging slidably with inner spline grooves 73b of a slide member 73 described later.

According to the preferred embodiment, a servomotor 70 is mounted to the insertion hole portion 40a of the front gear case 40 in the arrow X2 direction. The servomotor 70 is arranged in the arrow X2 direction (on the other side) relative to the vehicle center line L1. In addition, the servomotor 70 is an example of "front actuator" of the invention. In addition, the servomotor 70 actuates in a position downstream of a driving force relative to the front differential unit 50. Specifically, pinion gear 71 is mounted to the servomotor 70, the pinion gear 71 being enabled by the servomotor 70 to rotate in both directions. Rack 72 meshes with the pinion gear 71, the rack 72 enabling moving in the arrow X1 direction and in the arrow X2 direction as the pinion gear 71 rotates. Also, a projection 72a projecting forward (an arrow FWD direction) is provided on the rack 72 in the arrow X2 direction, the projection 72a engaging with an engagement groove portion 73a of the slide member 73. With the inner spline grooves 73b of the slide member 73 slidably engaged with the outer spline grooves 64b of the holding member 64 as described above, the servomotor 70 can move the slide member 73 relative to the holding member 64 in the arrow X1 direction and in the arrow X2 direction.

In the preferred embodiment, the inner spline grooves 73b can engage with the spline portion 61c of the right differential gear 61 when the slide member 73 slides in the arrow X1 direction. That is, the inner spline grooves 73b engages with the outer spline grooves 64 of the holding member 64 and the spline portion 61c of the right differential gear G1 at a time to enable inhibiting the right differential gear 61 from idling relative to the right front-wheel axle shaft 60. Thereby, a driving force of the right differential gear 61 transmitted from the pinion gear 53 can be transmitted to the right front-wheel axle shaft 60 through the holding member 64.

In the preferred embodiment, a plurality of outer spline grooves 73c may be formed on an outer peripheral surface of the slide member 73 toward the differential case 52. The plurality of outer spline grooves 73c can engage with the plurality of spline grooves 52b formed on an inner peripheral surface of the recess 52a of the differential case 52. There y, it becomes possible to rotate the differential case 52 through the slide member 73 together with the right front-wheel axle shaft 60.

Also, in the preferred embodiment, the left differential gear 63 of the left front-wheel axle shaft 62 includes a gear portion 63a comprising a helical gear, and a shaft inserted portion 63b. The gear portion 63a meshes with the pinion gear 53 and an inner peripheral surface of the shaft inserted portion 63b is spline-fitted onto an outer peripheral surface of the left front-wheel axle shaft 2. That is, the left differential gear 63 rotates together with the left front-wheel axle shaft 62. Also, the left front-wheel axle shaft 62 is arranged to enable idling relative to the differential case 52. Therefore, the left front-wheel axle shaft 62 can rotate upon rotation of the pinion gear 53.

Also, front wheels 65 (see FIG. 1), respectively, are mounted to an end of the right front-wheel axle shaft 60 in the arrow X2 direction and to an end of the left front-wheel axle shaft 62 in the arrow X1 direction.

In this manner, with the front differential unit 50 mounted on SSV according to the preferred embodiment, the inner spline grooves 73b of the slide member 73 are arranged most in the arrow X2 direction without engaging with the spline portion 61c of the right differential gear 1, whereby a driving force of the engine 20 is released to the right differential gear 61, which can idle relative to the right front-wheel axle shaft 60. Therefore, SSV according to the embodiment is put in a state, in which the driving force of the engine 20 is not transmitted to the right pair of front wheels 65.

Also, the inner spline grooves 73b of the slide member 73 are caused to engage with the spline portion 61c of the right differential gear 51, whereby the pinion gear 53 of the differential case 52 enables the right front-wheel axle shaft 50 and the left front-wheel axle shaft S2 to rotate in a state independent from each other. Thereby, the front wheels 65 (see FIG. 1) of SSV according to the embodiment are put in a differential-free state (differential state) since the driving force of the engine 20 is appropriately distributed to the right front-wheel axle shaft 60 and the left front-wheel axle shaft 62.

Also, the plurality of outer spline grooves 73c on the slide member 73 are caused to engage with the plurality of spline grooves 52b on the differential case 52 whereby the differential case 52 can rotate together with the right front-wheel axle shaft 60. Thereby, since the pinion gear 53 of the differential case 52 does not rotate, the left front-wheel axle shaft 62 rotates together with the right front-wheel axle shaft 60. That is, the front wheels 65 (see FIG. 1) of SSV according to the embodiment are put in a differential-lock state (differential locked state) since the driving force of the engine 20 is transmitted directly to the right front-wheel axle shaft 60 and the left front-wheel axle shaft 62.

Also, as shown in FIG. 2, according to the preferred embodiment, front end 80a of rear shaft 80 is mounted to the rear end 23a of the input gear 23. In addition, the rear shaft 80 is an example of "rear output shaft portion" of the invention. The rear shaft 80 is arranged in the arrow X1 direction relative to the vehicle center line L1, which extends longitudinally as viewed from above SSV, and inclined rearwardly downward (see FIG. 1). Also, a front portion of a connecting member 82 together with a parking brake disk 81a is mounted to a rear end 80b of the rear shaft 80.

Figure 4:
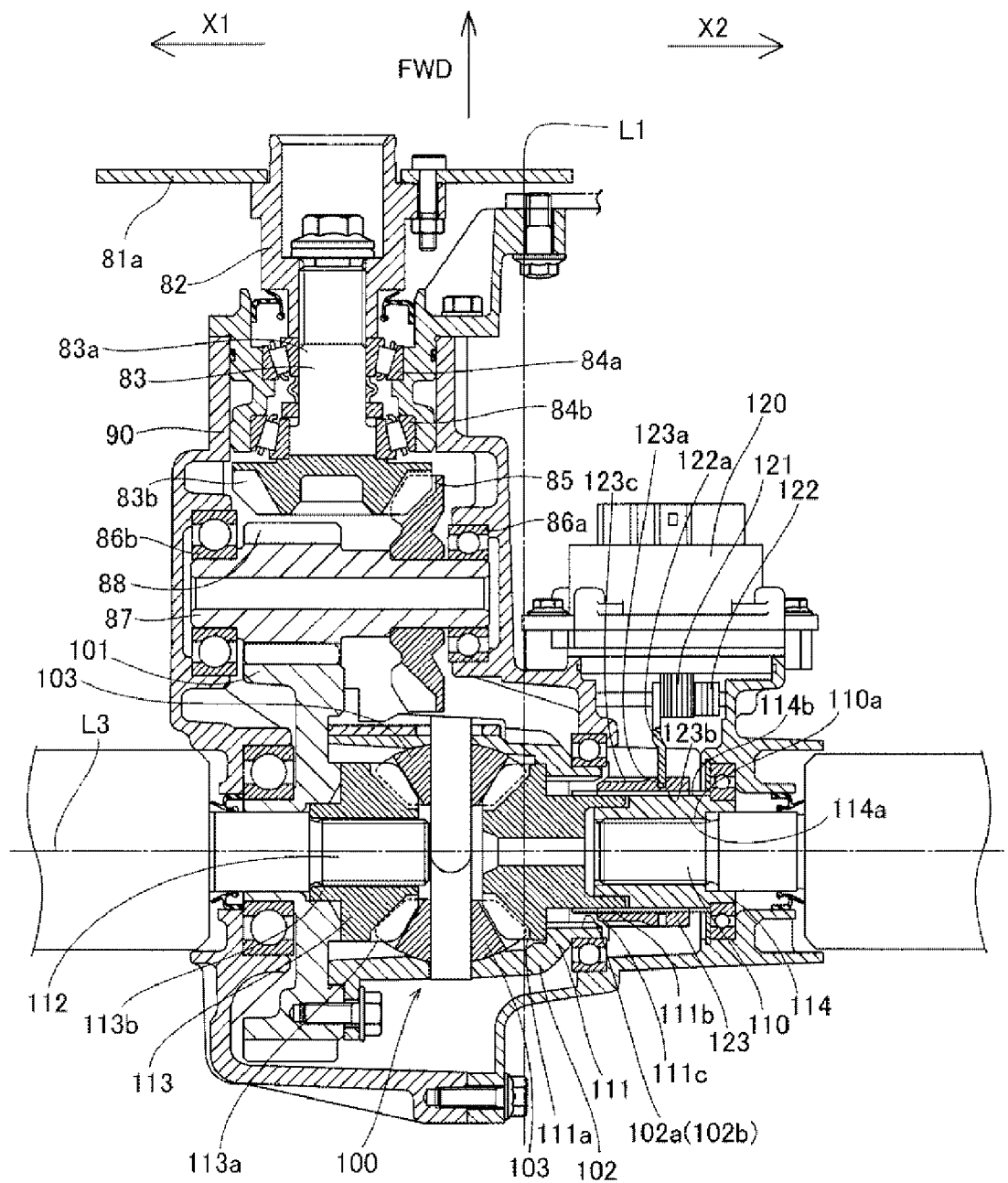
FIG. 4 is a cross sectional view showing the construction of the periphery of a rear differential unit of SSV according to the embodiment shown in FIG. 1.

As shown in FIG. 4, a rotating shaft portion 83a of an output gear 83 comprising a bevel gear is mounted to a rear portion of the connecting member 82. Also, the rotating shaft portion 83a of the output gear 83 is supported by bearings 84a, 84b, the bearings 84a, 84b, respectively, being arranged inside a rear gear case 90.

Also, as shown in FIG. 4, a gear portion 83b of the output gear 83 meshes with a first intermediate gear 85 provided in the rear gear case 90. The first intermediate gear 85 is supported by bearings 86a, 86b and mounted to an intermediate shaft 87 extending in the vehicle width direction (an arrow X1 direction and an arrow X2 direction). That is, the intermediate shaft 87 can be rotated by the rear shaft 80. In addition, the intermediate shaft 87 is an example of "intermediate shaft portion" of the invention. Also, a second intermediate gear 88 is formed on the intermediate shaft 87 to be made integral with the intermediate shaft 87, the second intermediate gear 88 meshing with a ring gear 101 of a rear differential unit 100. The rear differential unit 100 is an example of "rear-wheel differential unit" of the invention.

Ring gear 101 is mounted to differential case 102, the differential case 102 being constructed to be able to rotate relative to the rear gear case 90 as the ring gear 101 rotates. Also, a pair of pinion gears 103 are provided inside the differential case 102, and a right differential gear 111 of a right rear-wheel axle shaft 110, described later, and a left differential gear 113 of a left rear-wheel axle shaft 112, described later, mesh with the pair of pinion gears 103. In addition, the right rear-wheel axle shaft 110 and the left rear-wheel axle shaft 112 are an example of "a pair of rear-wheel axle shafts" of the invention. Also, an opening 102a is formed on the differential case 102 outwardly in the arrow X2 direction and a plurality of spline grooves 1021 are formed on an inner peripheral surface of the opening 102a.

The right differential gear 111 of the right rear-wheel axle shaft 110 includes a gear portion 111a comprising a bevel gear, a shaft inserted portion 111b and a spline portion 111c. The gear portion 111a meshes with the pinion gear 103 described above and the shaft inserted portion 111b is arranged so that an inner peripheral surface thereof can idle relative to an outer peripheral surface of the right rear-wheel axle shaft 110. Also, the spline portion 111c is formed on the outer peripheral surface of the shaft inserted portion 111b, the spline portion 111c engaging slidably with inner spline grooves 123b of a slide member 123 described later.

A plurality of spline grooves 110a are formed on the outer peripheral surface of the right rear-wheel axle shaft 110 in the arrow X2 direction, the plurality of spline grooves 110a engaging with inner spline grooves 114a formed on an inner peripheral surface of a holding member 114. Outer spline grooves 114b are formed on an outer peripheral surface of the holding member 114, the outer spline grooves 114b engaging slidably with the inner spline grooves 123b of the slide member 123 described later.

According to the preferred embodiment, a servomotor 120 is mounted outside the rear gear case 90 and adjacent to a region, in which the intermediate shaft 87 is arranged, in the arrow X2 direction (on one side in the vehicle width direction). The servomotor 120 is arranged on the same side (on a side in the arrow FW direction) as that of the intermediate shaft 87 relative to a center of rotation (axis of rotation L2) of the rear differential unit 100 as viewed from laterally of SSV. Specifically, the servomotor 120 is arranged to overlap the intermediate shaft 87 as viewed laterally. Also, the servomotor 120 is arranged in the arrow X2 direction (on the other side) relative to the vehicle center line L1. In addition, the servomotor 120 is an example of "rear actuator" of the invention.

Figure 5:
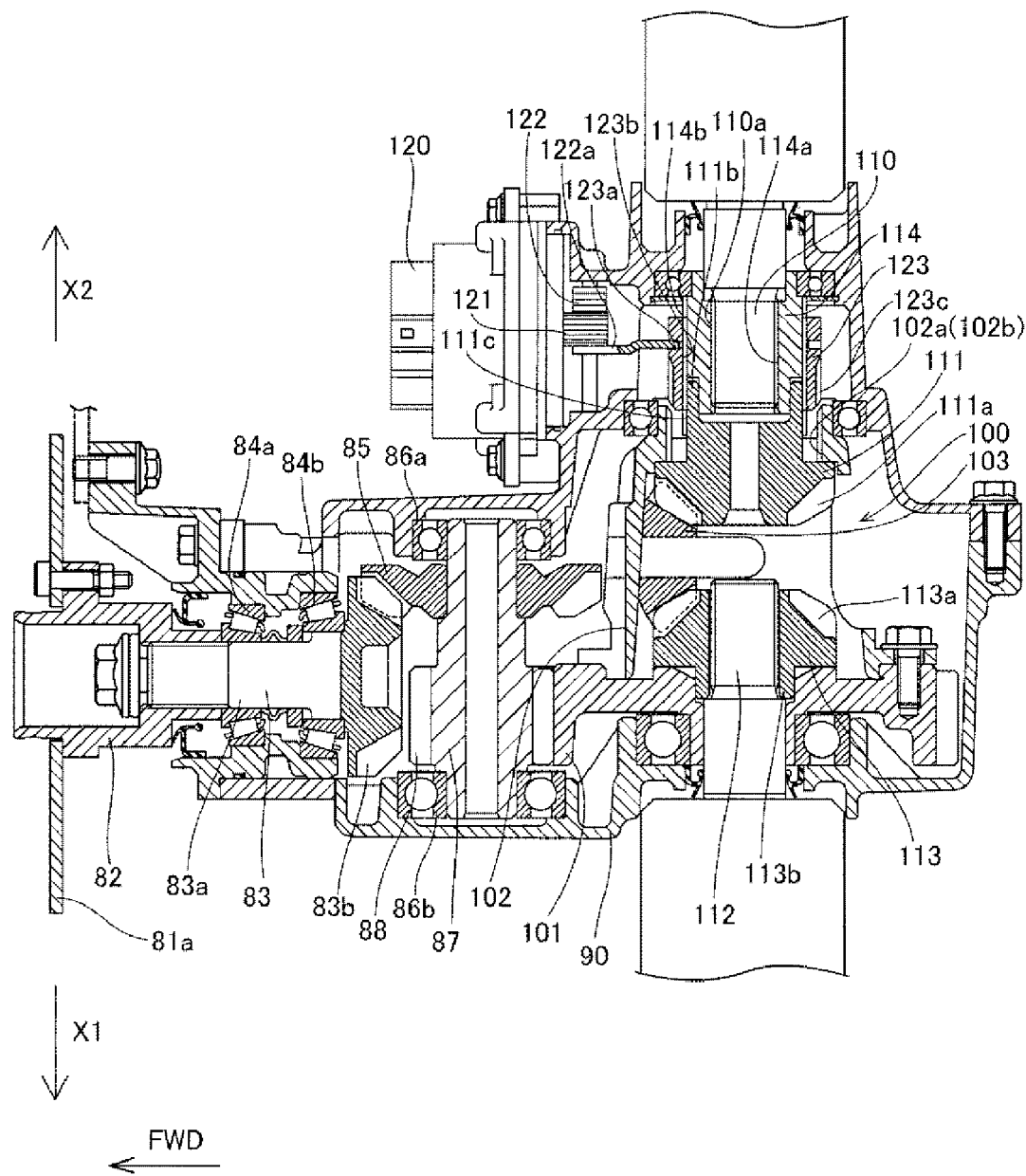
FIG. 5 is a cross sectional view showing the construction of the periphery of the rear differential unit of SSV according to the embodiment shown in FIG. 1.

Furthermore, as shown in FIG. 5, the servomotor 120 actuates in a position downstream of a driving force relative to the rear differential unit 100. Specifically, a pinion gear 121 is mounted to the servomotor 120. The pinion gear 121 being enabled by the servomotor 120 to rotate in both a clockwise and counter clockwise direction. Also, rack 122 meshes with the pinion gear 121. Rack 122 being allowed to make in the arrow X1 direction and in the arrow X2 direction as the pinion gear 121 rotates as shown on FIGS. 5 and 6. Projection 122a projecting rearward is provided on the rack 122 in the arrow X2 direction. Projection 122a engaging with an engagement groove portion 123a of the slide member 123. Thereby, since the inner spline grooves 123b of the slide member 123 engage slidably with the outer spine grooves 114b of the holding member 114 as described above, the servomotor 120 can move the slide member 123 relative to the holding member 114 in the arrow X1 direction and in the arrow X2 direction.

According to preferred embodiment, a plurality of outer spline grooves 123c are formed on an outer peripheral surface of the slide member 123 toward the differential case 102. The plurality of outer spline grooves 123c can engage with the plurality of spline grooves 102b formed on the inner peripheral surface of the opening 102a of the differential case 102. Thereby, the differential case 102 can rotate through the slide member 123 together with the right rear-wheel axle shaft 110.

Also, the left differential gear 113 of the left rear-wheel axle shaft 112 includes a gear portion 113a comprising a bevel gear, and a shaft inserted portion 113. The gear portion 113a meshes with the pinion gear 103 described above and an inner peripheral surface of the shaft inserted portion 113b is spline-fitted onto an outer peripheral surface of the left rear-wheel axle shaft 112. That is, the left differential gear 113 rotates together with the left rear-wheel axle shaft 112. Also, the left rear-wheel axle shaft 112 is arranged to enable idling relative to the differential case 102 and the left rear-wheel axle shaft 112 rotates as the pinion gear 103 rotates.

Also, rear wheels 115 (see FIG. 1), respectively, are mounted to an end of the right rear-wheel axle shaft 110 in the arrow X2 direction and to an end of the left rear-wheel axle shaft 112 in the arrow X1 direction.

As shown in FIG. 5, in this manner, with the rear differential unit 100 mounted on SSV according to the embodiment, since the inner spline grooves 123b of the slide member 123 engage with the spline portion 111c of the right differential gear 111, the pinion gear 103 of the differential case 102 enables the right rear-wheel axle shaft 110 and the left rear-wheel axle shaft 112 to rotate in a state of being independent of each other. Also, since the spline grooves 102 of the differential case 102 and the outer spline grooves 123c of the slide member 123 do not engage with each other, the differential case 102 and the left rear-wheel axle shaft 112 can rotate in a state of being independent of each other. Thereby, the rear wheels 115 (see FIG. 1) of SSV according to the embodiment are put in a differential-free state (differential state) since the driving force of the engine 20 is appropriately distributed to the right rear-wheel axle shaft 110 and the left rear-wheel axle shaft 112.

Figure 6:
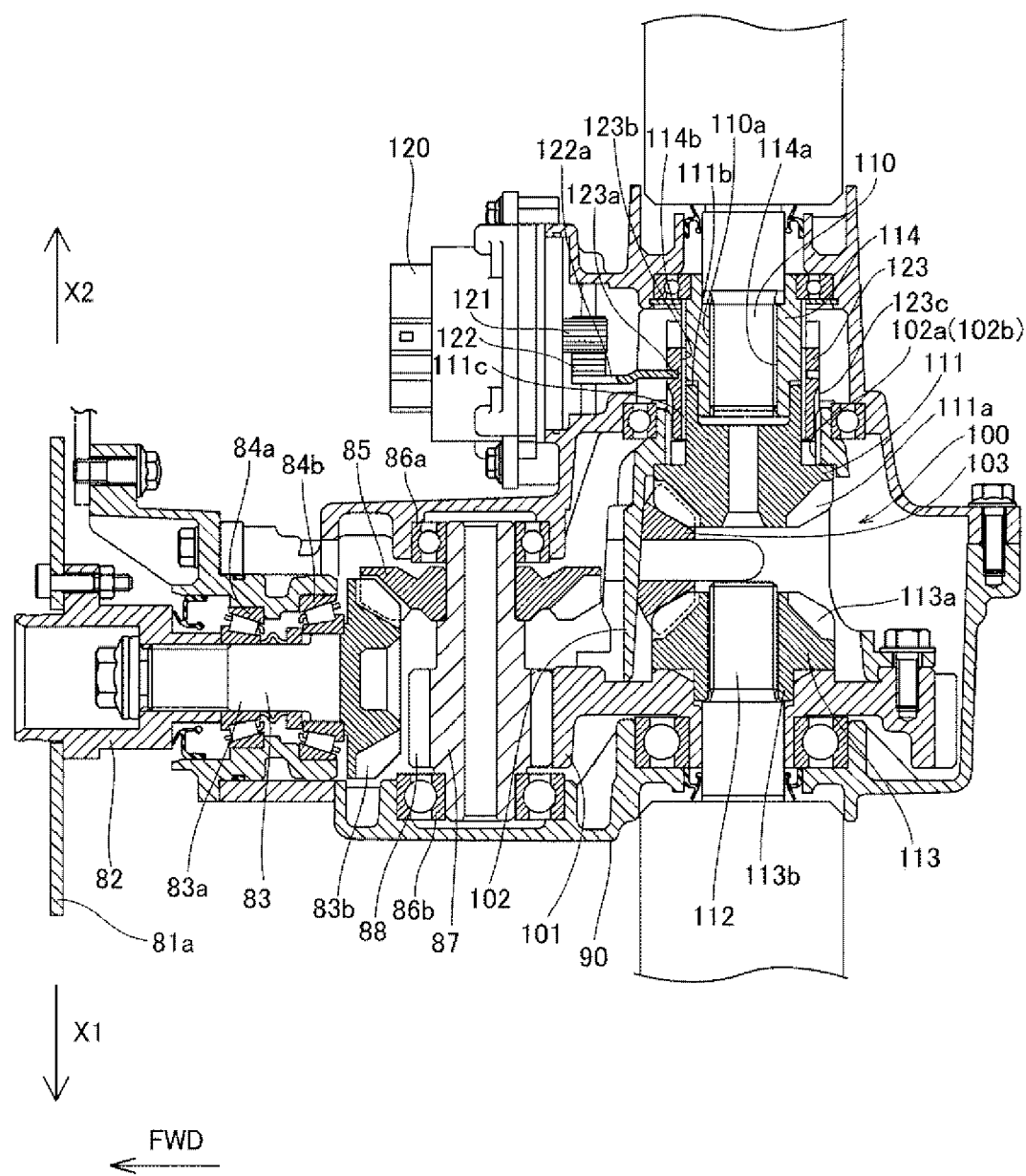
FIG. 6 is a cross sectional view showing the construction or the periphery of the rear differential unit of SSV according to the embodiment shown in FIG. 1.

As shown in FIG. 6, the plurality of outer spline grooves 123c of the slide member 123 are caused to engage with the plurality of spline grooves 1021 of the differential case 102 whereby the differential case 102 can rotate together with the right rear-wheel axle shaft 110. Thereby, since the pinion gear 103 of the differential case 102 does not rotate, the left rear-wheel axle shaft 112 rotates together with the right rear-wheel axle shaft 110. That is, the driving force of the engine 20 is transmitted directly to the right rear-wheel axle shaft 110 and the left rear-wheel axle shaft 112 whereby the rear wheels 115 of SSV according to this embodiment are put in a differential-lock state (differential locked state).

In addition, SSV according to the preferred embodiment is constructed so that the rotary switch 10 is operated to a predetermined dial position whereby the servomotor 70 and the servomotor 120 are actuated and that the front differential unit 50 and the rear differential unit 100 can be switched over to a combination of a predetermined state out of combinations of three kinds of states of the front differential unit 50 and two kinds of states of the rear differential unit 100.

Figure 7:
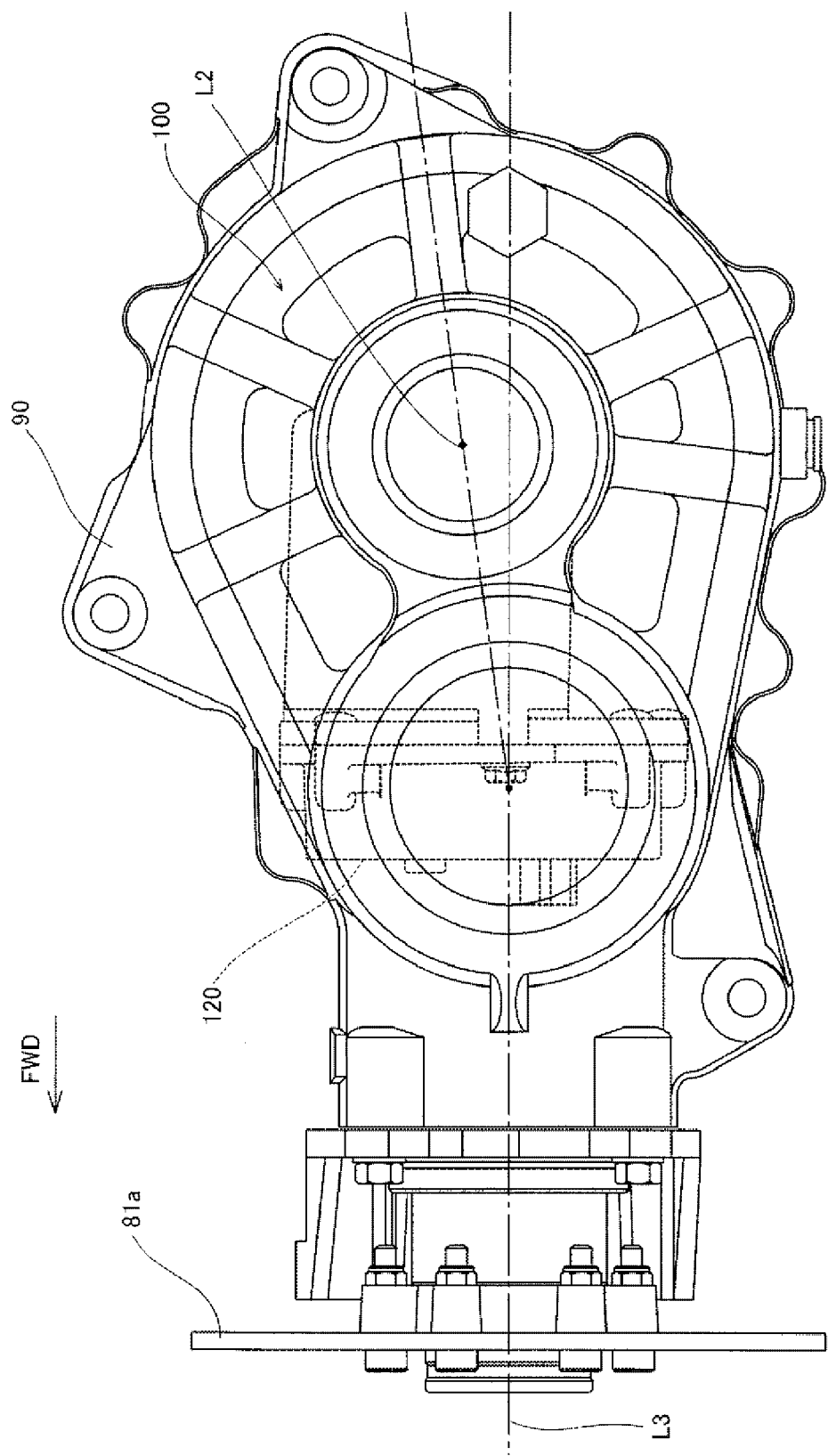
FIG. 7 is a side view showing the construction of a rear gear case of SSV according to the embodiment shown in FIG. 1.

Also, according to the preferred embodiment, the rear differential unit 100 is arranged below the rear row seats 5 and above a lower end of the main frame 2 as shown in FIG. 1. An axis of rotation (center of rotation) L2 of the rear differential unit 100 (differential case 102) is arranged above an extension of a center line L3 of the rear shaft 80 as shown in FIGS. 1 and 7 as viewed from laterally of SSV (see FIG. 1). That is, the rear differential unit 100 of SSV according to the embodiment is constructed to enable inhibiting a lower end of the rear gear case 90 from being arranged below the lower end of the main frame 2 (see FIG. 1).

Also, as shown in FIG. 1, the exhaust pipe 22 may be connected to the cylinder head portion 20c and arranged to extend rearward along the rear shaft 80. The exhaust pipe 22 is bent upwardly of the rear gear case 90 from the vicinity of the parking brake disk 81a and extended to the rear of the rear gear case 90 (the rear differential unit 100).

Figure 8:
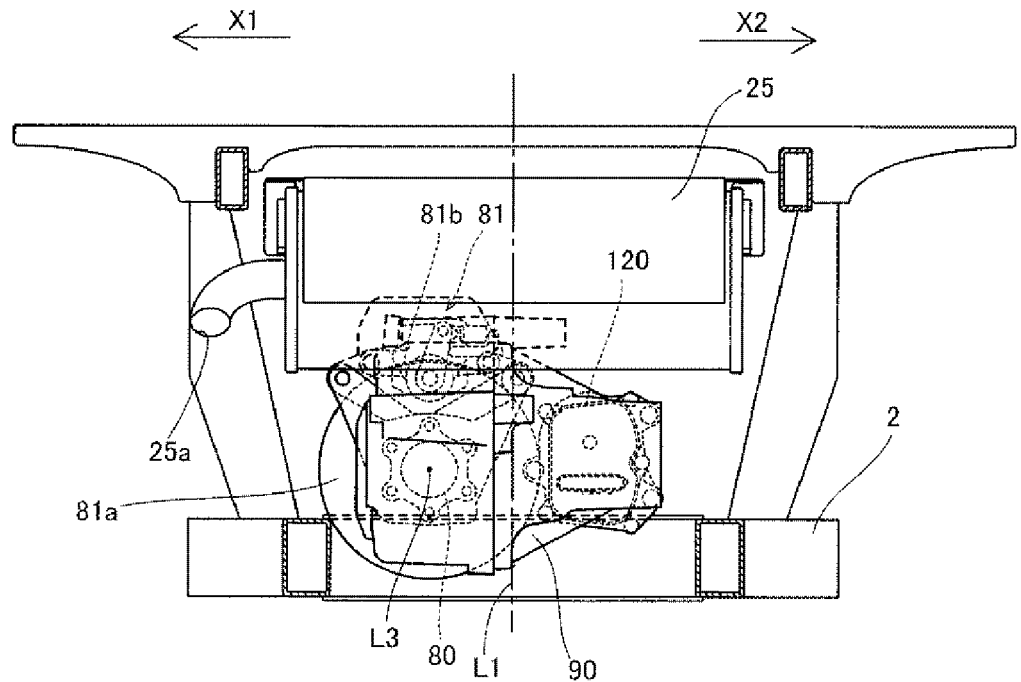
FIG. 8 is a rear view showing the construction of the periphery of a muffler of SSV according to the embodiment shown in FIG. 1.

As shown in FIGS. 1 and 8, a muffler 25 is connected to a rear end of the exhaust pipe 22. The muffler 25 is arranged to extend in the vehicle width direction (the arrow X1 direction and the arrow X2 direction) and connected to the exhaust pipe 22 rearwardly of the rear gear case 90 (the rear differential unit 100. Also, an exhaust port 25a is provided on the muffler 25 in the arrow X1 direction, so that combustion gases burnt in the engine 20 are exhausted from the exhaust port 25a.

Figure 9:
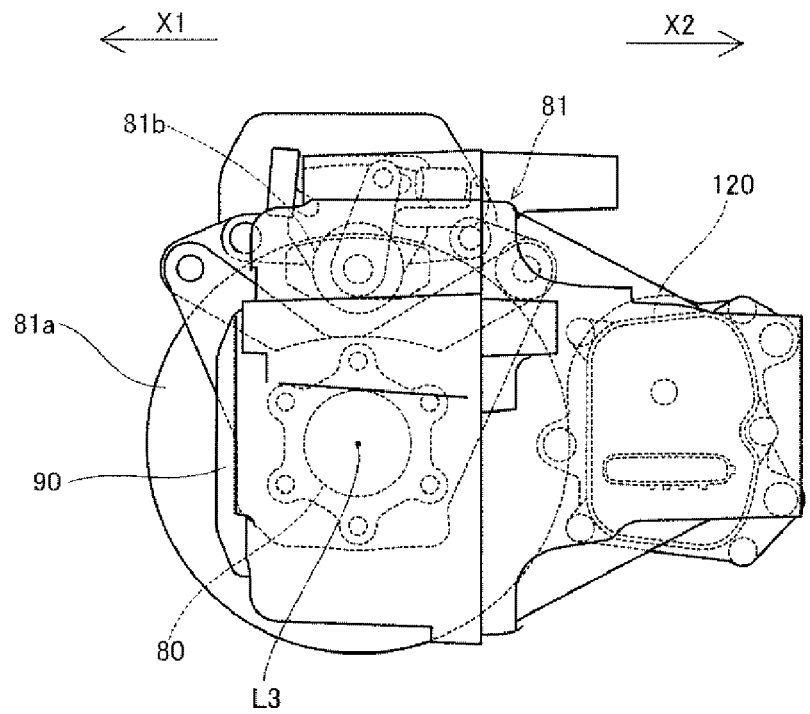
FIG. 9 is a rear view illustrating the positional relationship between a caliper and a servomotor of SSV according to the embodiment shown in FIG. 1.

As shown in FIGS. 1 and 9, a caliper 81b capable of braking the parking brake disk 81a is provided above the parking brake disk 81a. The caliper 81b is arranged in a rotating angle position about the rear shaft 80, which position is different from that of the servomotor 120, as viewed from rearwardly of SSV. Specifically, the caliper 81b is arranged above the rear shaft 80 and the servomotor 120 is arranged on a side of the rear shaft 80 in the arrow X2 direction. In addition, the parking brake disk 81a and the caliper 81b constitute parking brake 81.

According to the embodiment, as described above, there are provided the rear shaft 80, by which the driving force of the engine 20 is transmitted rearward, the intermediate shaft 87, which is rotated by the rear shaft 80 and extends in the vehicle width direction (the arrow X1 direction and the arrow X2 direction), and the rear differential unit 100 for differential movements of the right rear-wheel axle shaft 110 and the left rear-wheel axle shaft 112, which are rotated by the intermediate shaft 87 and connected to the pair of rear wheels 115.

In this manner, unlike the case where the driving force of the engine 20 is transmitted directly to the rear differential unit 100 from the rear shaft 80, the intermediate gear assembly provides for a similar vertical profile (first intermediate gear 85 and the second intermediate gear 88 are provided on the intermediate shaft 87 so that a gear for rotation of the rear differential unit 100 is not made large in diameter.) Thereby, since it is possible to inhibit a gear for rotation of the rear differential unit 100 from being made large, it is possible to inhibit the rear differential unit 100 from becoming large in a vertical direction.

Also, according to an embodiment, as described above, the center of rotation (axis of rotation L2) of the rear differential unit 100 may be positioned above the center of rotation of the intermediate shaft 87 as viewed from laterally of SSV whereby a position of a lower end of the rear differential unit 100 can be arranged in an upper region.

Also, according to an embodiment, as described above, the rear shaft 80 may be arranged to be inclined rearwardly downward whereby a position of the rear gear case 90 can be inhibited from being arranged in an upper region.

Also, according to the embodiment, as described above, a servomotor 120 is arranged on the same side (on a side in the arrow FWD direction) as that of the intermediate shaft 87 relative to the center of rotation (axis of rotation L2) of the rear differential unit as viewed from laterally of SSV whereby the servomotor 120 being a relatively heavy part can be arranged toward a center of a vehicle body of SSV as compared with the case where the servomotor is arranged on an opposite side (on a side in the arrow FWD direction) of the center of rotation (axis of rotation L2) of the rear differential unit to the intermediate shaft 87 as viewed from laterally of SSV. Thereby, it is possible to inhibit a center of gravity of the vehicle body of SSV from being shifted toward the rear of the vehicle body of SSV.

Also, according to an embodiment, as described above, the servomotor 120 is arranged to overlap the intermediate shaft 87 as viewed from laterally of SSV.

Also, according to an embodiment, as described above, the servomotor 120 is arranged adjacent to one end of the intermediate shaft 87 in the vehicle width direction (in the arrow X2 direction) as viewed from above SSV.

Also, according to an embodiment, as described above, the differential state and the differential locked state of the front differential unit 50 can be switched over and a driving force for the right front-wheel axle shaft 60 the left front-wheel axle shaft 62 is enabled to intermit. In this manner, it is possible to obtain not only a SSV, in which the differential state and the differential locked state of the front differential unit 50 can be switched over, but also a SSV which can be switched to two-wheel drive from four-wheel drive by enabling a driving force for the right front-wheel axle shaft 60 and the left front-wheel axle shaft 62 to intermit.

Also, according to an embodiment, as described above, the front servomotor 70 and the rear servomotor 120 are arranged on sides of the rear shaft 80 and the front shaft 30 toward the vehicle center line L1 as viewed from above SSV. Thereby, it is possible to inhibit the servomotor 70 and the servomotor 120, which are heavy parts, and the rear shaft 80 and the front shaft 30 from being arranged offset to one side of the vehicle center line L1. Consequently, it is possible to inhibit SSV from being unbalanced in weight.

Also, according to the embodiment, as described above, by arranging the servomotor 70 and the servomotor 120 on a side (the other side) of the vehicle center line L1 in the arrow X2 direction, corresponding to the front shaft 30 and the rear shaft 80, which are arranged on a side (one side) of the vehicle center line L1 in the arrow X1 direction, it is possible to inhibit a vehicle balance in the vehicle width direction from being offset in either of the arrow X1 direction and the arrow X2 direction.

Also, according to an embodiment, as described above, the rear differential unit 100 is arranged below the rear row seats 5 whereby it is possible to make effective use of a space below the rear row seats 5.

Also, according to an embodiment, as described above, the axis of rotation (center of rotation) L2 of the rear differential unit 100 can be arranged above the extension of the center line L of the rear shaft 80 as viewed from laterally of SSV whereby it is possible to inhibit the rear differential unit 100 from becoming too low in position even in the case where the rear shaft 80 is arranged in a state of being inclined rearwardly downward.

In addition, it should be understood that an embodiment described herein is illustrative in all respects and not restrictive. The scope of the invention is indicated by the appended claims rather than the foregoing descriptions of the embodiment, and all changes which come within the meaning and range of equivalence thereof are intended to be embraced therein.

For example, while the embodiment shows SSV (All Terrain Vehicle) as an example of a small-sized vehicle, the invention is not limited thereto but applicable to other small-sized vehicles such as CCV (Cross Country Vehicle), ATV (All Terrain Vehicle), etc. provided that a differential unit for differential movements of rear-wheel axle shafts is provided.

Also, while the embodiment shows an example, in which the rear propeller shaft is inclined rearwardly downward and the center of rotation of the rear differential units arranged above the center of rotation of the intermediate shaft as viewed from laterally of SSV, the invention is not limited thereto but the rear propeller shaft may be inclined rearwardly upward and the center of rotation of the rear differential unit may be arranged below the center of rotation of the intermediate shaft as viewed from laterally of SSV.

Also, while the embodiment shows an example, in which the servomotor is arranged on a side of the intermediate shaft in the arrow X2 direction as viewed from above SSV, the invention is not limited thereto but the servomotor may be arranged in a position on a side of the intermediate shaft in the arrow X1 direction except a side of the intermediate shaft in the arrow X2 direction.

Also, while the embodiment shows servomotors as examples of the rear actuator and the front actuator of the invention, the invention is not limited thereto but other actuators such as solenoid, stepping motor, etc. may be applied provided that the differential state and the differential locked state of the rear differential unit and the front differential unit can be switched over.

Also, while the embodiment shows an example, in which the axis of rotation of the rear differential unit is arranged above the extension of the rear propeller shaft, the invention is not limited thereto but the axis of rotation of the rear differential unit may be arranged below the extension of the rear propeller shaft.

The invention claimed is:

1. A small-sized vehicle comprising:
   an engine;
   a rear output shaft portion arranged to transmit a driving force of the engine rearward;
   an intermediate shaft portion in communication with the rear output shaft portion arranged to rotate about an axis aligned in a vehicle width direction; and
   a rear-wheel differential unit arranged to be rotated by the intermediate shaft portion and to provide differential movements of a pair of rear-wheel axle shafts connected to a pair of rear wheels; wherein
   a center of rotation of the rear-wheel differential unit is positioned above a center of rotation of the intermediate shaft portion as viewed laterally of the vehicle; and
   the rear output shaft portion is inclined rearwardly downward.

2. The small-sized vehicle according to claim 1, further including a rear actuator arranged to switch the rear-wheel differential unit between a differential state and a differential locked state.

3. The small-sized vehicle according to claim 2, wherein the rear actuator is arranged on the same side as that of the intermediate shaft portion relative to a center of rotation of the rear-wheel differential unit as viewed from laterally of the vehicle.

4. The small-sized vehicle according to claim 2, wherein the rear actuator is arranged to overlap the intermediate shaft portion as viewed from laterally of the vehicle.

5. The small-sized vehicle according to claim 2, wherein the rear actuator is arranged adjacent to one end of the intermediate shaft portion in the vehicle width direction as viewed from above the vehicle.

6. The small-sized vehicle according to claim 2, further comprising:
a front output shaft portion arranged to extend forwardly of the engine and to transmit a driving force of the engine forward, and
a front-wheel differential unit rotated by the front output shaft portion and to provide differential movements of a pair of front-wheel axle shafts connected to a pair of front wheels, wherein
the front-wheel differential unit is arranged to be switched between a differential state and a differential locked state and a driving force is intermittently transferred to the pair of front-wheel axle shafts.

7. The small-sized vehicle according to claim 6, further comprising:
a front actuator arranged to switch the front-wheel differential unit between a differential state and a differential locked state and to cause a driving force to be intermittently transferred to the pair of front-wheel axle shafts wherein
wherein the rear output shaft portion and the front output shaft portion are arranged on one side of a vehicle center line, which extends longitudinally as viewed from above the vehicle, and
the front actuator and the rear actuator, respectively, are arranged on a side of the rear output shaft portion and the front output shaft portion toward the vehicle center line as viewed from above the vehicle.

8. The small-sized vehicle according to claim 7, wherein at least one of the front actuator and the rear actuator is arranged on an opposite side to the vehicle center line.

9. The small-sized vehicle according to claim 2, wherein the rear actuator actuates in a position downstream of a driving force relative to the rear-wheel differential unit.

10. The small-sized vehicle according to claim 2, wherein the rear actuator comprises a servomotor.

11. The small-sized vehicle according to claim 1, further comprising:
a front row seat, and
a rear row seat arranged rearwardly of the front row seat, wherein
the rear-wheel differential unit is arranged below the rear row seat.

12. The small-sized vehicle according to claim 1, further comprising an output gear arranged to rotate about an axis of the rear output shaft portion, wherein the intermediate shaft portion includes a single intermediate shaft portion arranged between the rear output shaft portion and the rear-wheel differential unit, and the single intermediate shaft portion includes a first intermediate gear arranged to directly engage the output gear and a second intermediate gear arranged to directly engage a gear of the rear-wheel differential unit.

13. A drive train system for a small-sized vehicle, the drive train system comprising:
an engine,
a rear output shaft portion arranged to extend rearwardly of the engine and to transmit a driving force of the engine rearward,
said rear output shaft portion arranged to rotate about a longitudinal axis of the vehicle,
an intermediate shaft portion in communication with said rear output shaft portion and arranged to rotate about a lateral axis of the vehicle, and
a rear-wheel differential unit arranged to be rotated by the intermediate shaft portion and to provide differential movements of a pair of rear-wheel axle shafts connected to a pair of rear wheels, wherein
said rear-wheel differential unit is arranged to rotate about an axis which is non-planar with the longitudinal axis of rotation of said rear output shaft,
a center of rotation of the rear-wheel differential unit is positioned above a center of rotation of the intermediate shaft portion as viewed laterally of the vehicle, and
the rear output shaft portion is inclined rearwardly downward.

14. The drive train system of claim 13, wherein the rear actuator is arranged on the same side as that of the intermediate shaft portion relative to a center of rotation of the rear-wheel differential unit as viewed along the axis of rotation of said rear output shaft portion.

15. The drive train system of claim 14 wherein the rear actuator is planarly offset laterally from said intermediate shaft portion.

16. The drive train system of claim 13, wherein the rear actuator is arranged adjacent to one end of the intermediate shaft portion in the vehicle width direction.

17. The drive train system according to claim 13, further comprising:
a front output shaft portion arranged to extend forwardly of the engine and to transmit a driving force of the engine forward, and
a front-wheel differential unit arranged to be rotated by the front output shaft portion and to provide differential movements of a pair of front-wheel axle shafts adapted for connection to a pair of front wheels, wherein
the front-wheel differential unit is arranged to be switched between a differential state and a differential locked state and a driving force is intermittently transferred to the pair of front-wheel axle shafts.

18. The drive train system according to claim 17, further comprising
a front actuator arranged to switch the front-wheel differential unit between a differential state and a differential locked state and to cause a driving force to be intermittently transferred to the pair of front-wheel axle shafts, wherein
the rear output shaft portion and the front output shaft portion are arranged on one side of a longitudinal centerline of the vehicle, and
the front actuator and the rear actuator, respectively, are arranged such that at least one of said front or rear actuators resides on the opposite side of said vehicle centerline as said rear and front output shaft portions reside.

19. The drive train system of claim 13, wherein the rear actuator actuates in a position downstream of a driving force relative to the rear-wheel differential unit.

20. The drive train system according to claim 13, wherein the rear actuator comprises a servomotor.

21. The small-sized vehicle according to claim 13, further comprising an output gear arranged to rotate about an axis of the rear output shaft portion, wherein the intermediate shaft portion includes a single intermediate shaft portion arranged between the rear output shaft portion and the rear-wheel differential unit, and the single intermediate shaft portion includes a first intermediate gear arranged to directly engage the output gear and a second intermediate gear arranged to directly engage a gear of the rear-wheel differential unit.

22. A small-sized vehicle comprising:
an engine, a rear output shaft portion arranged to transmit a driving force of the engine rearward, an intermediate shaft portion in communication with the rear output shaft portion and arranged to rotate about an axis aligned in a vehicle width direction, a rear-wheel differential unit arranged to be rotated by the intermediate shaft portion and to provide differential movements of a pair of rear-wheel axle shafts connected to a pair of rear wheels, a rear actuator arranged to switch the rear-wheel differential unit between a differential state and a differential locked state, a front output shaft portion arranged to extend forwardly of the engine and to transmit a driving force of the engine forward, a front-wheel differential unit rotated by the front output shaft portion and to provide differential movements of a pair of front-wheel axle shafts connected to a pair of front wheels, wherein the front-wheel differential unit is arranged to be switched between a differential state and a differential locked state and a driving force is intermittently transferred to the pair of front-wheel axle shafts, a front actuator is arranged to switch the front-wheel differential unit between a differential state and a differential locked state and to cause a driving force to be intermittently transferred to the pair of front-wheel axle shafts, said rear output shaft portion and the front output shaft portion are arranged on one side of a vehicle center line, which extends longitudinally as viewed from above the vehicle, at least one switch arranged to control the positions of said front and rear actuators to determine the differential operations of said front and rear differentials, a center of rotation of the rear-wheel differential unit is positioned above a center of rotation of the intermediate shaft portion as viewed laterally of the vehicle, and the rear output shaft portion is inclined rearwardly downward.

23. The small-sized vehicle according to claim 22, further comprising an output gear arranged to rotate about an axis of the rear output shaft portion, wherein the intermediate shaft portion includes a single intermediate shaft portion arranged between the rear output shaft portion and the rear-wheel differential unit, and the single intermediate shaft portion includes a first intermediate gear arranged to directly engage the output gear and a second intermediate gear arranged to directly engage a gear of the rear-wheel differential unit.

* * * * *